(12) United States Patent
Ludwig et al.

(10) Patent No.: US 11,214,416 B2
(45) Date of Patent: Jan. 4, 2022

(54) BUBBLE VALVE FOR FLEXIBLE PACKAGING

(71) Applicant: ILLINOIS TOOL WORKS INC., Glenview, IL (US)

(72) Inventors: Christopher Ludwig, Buffalo Grove, IL (US); Eric Plourde, Frankfort, IL (US); Clifton Howell, Buford, GA (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 0 days.

(21) Appl. No.: 16/606,951

(22) PCT Filed: Nov. 14, 2017

(86) PCT No.: PCT/US2017/061500
§ 371 (c)(1),
(2) Date: Oct. 21, 2019

(87) PCT Pub. No.: WO2018/194714
PCT Pub. Date: Oct. 25, 2018

(65) Prior Publication Data
US 2020/0189810 A1 Jun. 18, 2020

Related U.S. Application Data

(60) Provisional application No. 62/487,598, filed on Apr. 20, 2017, provisional application No. 62/490,686, (Continued)

(51) Int. Cl.
| | |
|---|---|
| *B65D 47/04* | (2006.01) |
| *B65D 47/20* | (2006.01) |
| *B32B 27/08* | (2006.01) |
| *B32B 27/32* | (2006.01) |
| *B65D 75/58* | (2006.01) |

(52) U.S. Cl.
CPC ......... *B65D 47/2018* (2013.01); *B32B 27/08* (2013.01); *B32B 27/32* (2013.01);
(Continued)

(58) Field of Classification Search
CPC ............ B65D 75/5911; B65D 75/5883; B65D 47/2018; B65D 33/01; B65D 33/16; B32B 27/08; B32B 27/32; B32B 2250/242
(Continued)

(56) References Cited

U.S. PATENT DOCUMENTS 2,028,843 A * 1/1936 Pischke .............. B65D 47/2018
                                                          222/491
2,720,903 A * 10/1955 Pickren ............... A24F 19/0064
                                                          206/102
(Continued)

FOREIGN PATENT DOCUMENTS

| CN | 1678501 | 10/2005 |
|---|---|---|
| CN | 201923430 | 8/2011 |

(Continued)

OTHER PUBLICATIONS

International Search report issued in PCT/US/2017/061500 dated Jan. 31, 2018.

*Primary Examiner* — Charles P. Cheyney
(74) *Attorney, Agent, or Firm* — McCarter & English, LLP

(57) ABSTRACT

The present disclosure relates to a valve, a method for forming a valve, and a package. The valve is made of at least three layers—a first exterior layer (i.e., a base layer), at least one interior layer (i.e., a bubble layer), and a second exterior layer (i.e., a channel layer)—and an attachment section located on each of at least two of the at least three layers. A bubble is formed between two of the first exterior layer and the at least one interior layer, and the bubble includes an enclosed material. A channel is formed between two of the second exterior layer, the at least two interior layers, and the first exterior layer, and the channel includes an inlet and an outlet. A physical characteristic of the bubble biases the (Continued)

channel towards a closed position that restricts flow of contents from the inlet to the outlet.

20 Claims, 17 Drawing Sheets

Related U.S. Application Data filed on Apr. 27, 2017, provisional application No. 62/500,123, filed on May 2, 2017, provisional application No. 62/545,229, filed on Aug. 14, 2017.

(52) U.S. Cl.
CPC ...... *B65D 75/5811* (2013.01); *B65D 75/5883* (2013.01); *B32B 2250/242* (2013.01); *B32B 2553/00* (2013.01)

(58) Field of Classification Search
USPC .................................. 222/92–107, 212, 498
See application file for complete search history.

(56) References Cited

U.S. PATENT DOCUMENTS

| | | | | |
|---|---|---|---|---|
| 3,636,376 A * | 1/1972 | Hoffmann | ............. | H03K 23/54 377/78 |
| 4,592,493 A * | 6/1986 | Smith | ................ | B65D 47/2031 222/212 |
| 5,080,248 A * | 1/1992 | Stocchiero | ............... | F16J 15/46 220/232 |
| 6,732,889 B2 * | 5/2004 | Oren | ...................... | B65D 5/748 222/494 |
| 7,207,717 B2 | 4/2007 | Steele | | |
| 7,828,176 B2 * | 11/2010 | Harper | ................... | A45D 34/04 222/207 |
| 7,883,268 B2 | 2/2011 | Steele | | |
| 8,201,690 B1 | 6/2012 | Gess | | |
| 8,613,547 B2 * | 12/2013 | Steele | ................... | B65D 33/01 383/63 |
| 9,963,284 B2 | 5/2018 | Steele | | |
| 10,155,354 B2 * | 12/2018 | Steele | ................... | B65D 33/01 |
| 2011/0042407 A1 | 2/2011 | Steele | | |
| 2016/0297571 A1 * | 10/2016 | Steele | ................ | B65D 75/5866 |

FOREIGN PATENT DOCUMENTS

| | | |
|---|---|---|
| CN | 104379462 | 2/2015 |
| JP | 57192479 | 12/1982 |
| WO | 2016069883 | 5/2016 |
| WO | 2016164185 | 10/2016 |
| WO | 2018194714 | 10/2018 |

* cited by examiner

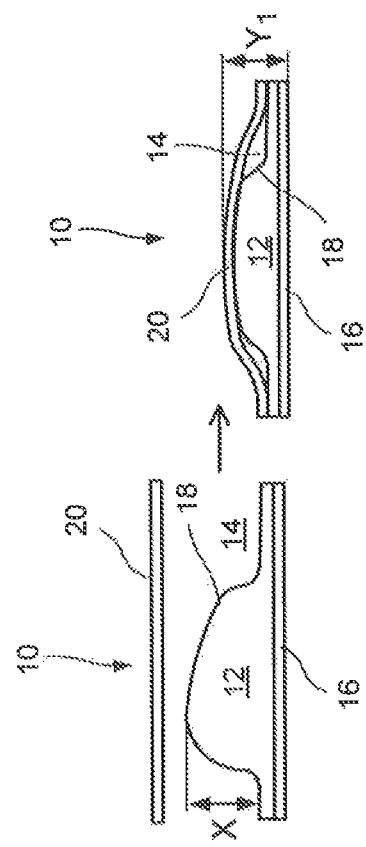

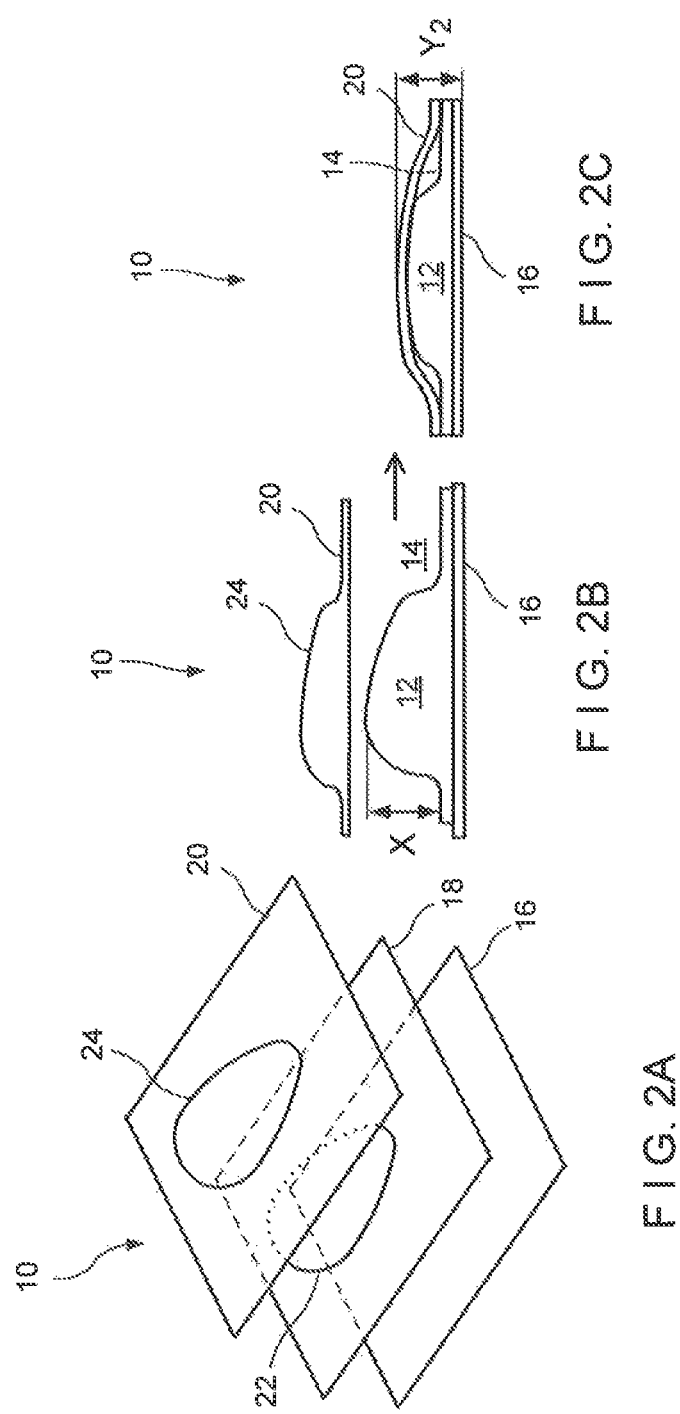

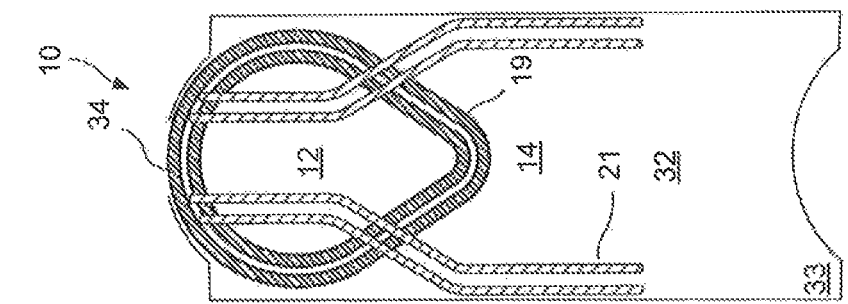
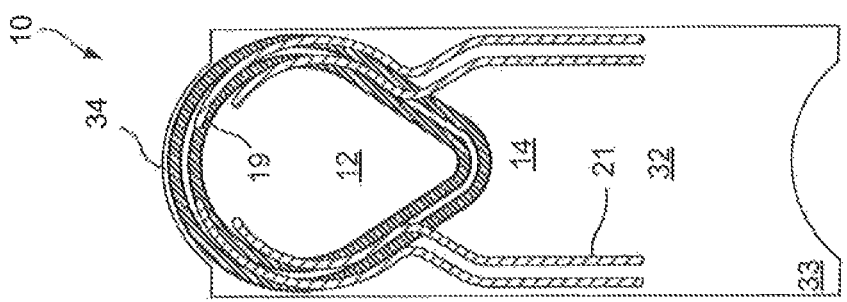
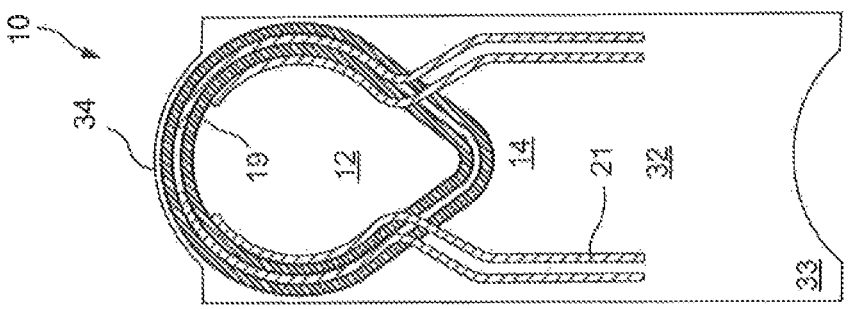
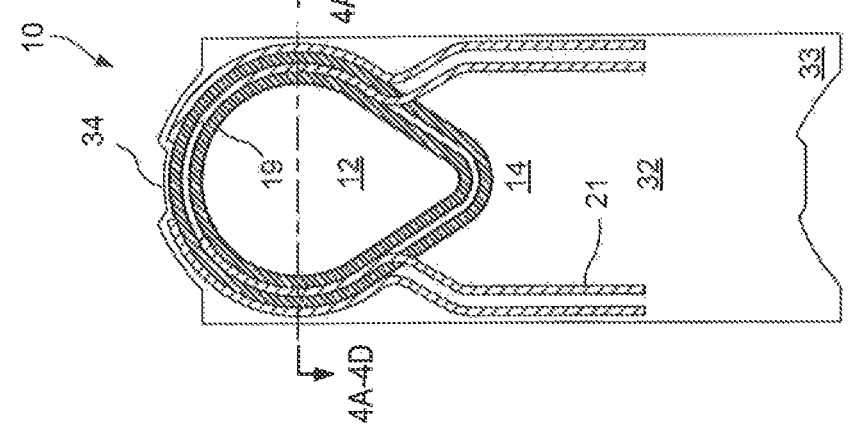

BUBBLE VALVE FOR FLEXIBLE PACKAGING

This application is a National Phase Application of PCT International Application No.: PCT/US2017/061500, filed on Nov. 14, 2017, which claims priority under 35 U.S.C. 119(e) of U.S. Provisional Application Ser. No. 62/487,598, filed Apr. 20, 2017, U.S. Provisional Application Ser. No. 62/490,686, filed on Apr. 27, 2017, U.S. Provisional Application Ser. No. 62/500,123, filed May 2, 2017 and U.S. Provisional Application No. 62/545,229, filed on Aug. 14, 2017, the contents of which is hereby incorporated by reference in its entirety and for all purposes.

BACKGROUND OF THE DISCLOSURE

Description of the Prior Art

Prior art packaging in the food/beverage, personal care and household care industries is primarily a combination of a rigid bottle or semi-flexible tube with a rigid fitment or cap of varying dispense types. Transition to flexible pouches for the main body of the container has continued to utilize similar, still rigid, fitments. There exists a need within these industries to complete the transition in order to create a fully flexible solution.

Prior art iterations of a plastic valve for flexible pouches required many manufacturing steps, material, and time. First, a rectangular pocket of ambient air is trapped between two sheets of plastic film. Then the pocket is repeatedly condensed in footprint by the use of successive heat seals on pouch making equipment. Reduction of the area gradually increases the amount of internal pressure within the formed bubble. There exists a need for a method of manufacturing a bubble in flexible packaging using less manufacturing steps, material, and time.

The prior art includes U.S. Pat. No. 8,613,547 entitled "Packages Having Bubble-Shaped Closures"; U.S. Pat. No. 7,883,268 entitled "Package Having a Fluid Activated Closure"; U.S. Pat. No. 7,207,717 entitled "Package Having a Fluid Activated Closure"; and U.S. Published Application 2016/0297571 "Package Valve Closure System and Method."

OBJECTS AND SUMMARY OF THE DISCLOSURE

It is therefore an object of the present disclosure to provide an improved valve for customer applications, and method of manufacture therefor. These and other objects are attained by providing a valve made of a channel and a bubble that can be attached to a flexible package to enable the controlled release of products by means of applying pressure.

In a presently contemplated valve for permitting selective dispensing of contents of a package, the valve is made of at least three layers—a first exterior layer (i.e., a base layer), at least one interior layer (i.e., a bubble layer), and a second exterior layer (i.e., a channel layer)—and an attachment section located on each of at least two of the at least three layers. A bubble is formed between two of the first exterior layer and the at least one interior layer, and the bubble includes an enclosed material. A channel is formed between two of the second exterior layer, the at least two interior layers, and the first exterior layer, and the channel includes an inlet and an outlet. A physical characteristic of the bubble biases the channel towards a closed position that restricts flow of contents from the inlet to the outlet.

In a presently contemplated method of forming a valve, a bubble is formed between two of a first exterior layer (i.e., a base layer) and at least one interior layer (i.e., a bubble layer) by applying a bubble seal between said layers and enclosing an enclosed material in the bubble. A channel is formed between two of a second exterior layer (i.e., a channel layer), the at least one interior layer, and the first exterior layer by applying a channel seal between said layers. The channel includes an inlet and an outlet. The bubble includes a physical characteristic that restricts flow of contents from the inlet to the outlet.

In a presently contemplated package for retaining and dispensing contents to a user, the package includes an internal volume and a valve. The internal volume is defined between a rear panel portion and a front panel portion. The valve is made of at least three layers—a first exterior layer (i.e., a base layer), at least one interior layer (i.e., a bubble layer), and a second exterior layer (i.e., a channel layer)—and an attachment section located on each of at least two of the at least three layers. A bubble is formed between two of the first exterior layer and the at least one interior layer, and the bubble includes an enclosed material. A channel is formed between two adjacent layers and the channel includes an inlet and an outlet. A physical characteristic of the bubble biases the channel towards a closed position that restricts flow of contents from the inlet to the outlet.

BRIEF DESCRIPTION OF THE DRAWINGS

Further objects and advantages of the disclosure will become apparent from the following description and from the accompanying drawings, wherein:

FIG. 1A is a perspective view illustrating layers of a first embodiment of a valve of the present disclosure.

FIG. 1B is a side view illustrating assembly of the first embodiment of a valve of the present disclosure.

FIG. 1C is a side view illustrating the first embodiment of a valve of the present disclosure.

FIG. 2A is a perspective view illustrating layers of a second embodiment of a valve of the present disclosure.

FIG. 2B is a side view illustrating assembly of the second embodiment of a valve of the present disclosure.

FIG. 2C is a side view illustrating the second embodiment of a valve of the present disclosure.

FIGS. 3A-3D are first top views of embodiments of the valve of the present disclosure, illustrating various configurations which vary the flow resistance of the valve.

DETAILED DESCRIPTION OF THE PREFERRED EMBODIMENTS

Figure 4A:
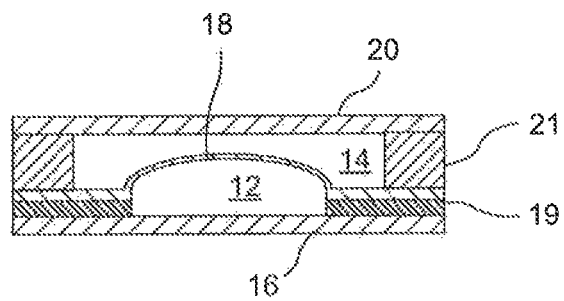
FIGS. 4A, 4B, 4C and 4D are cross-sectional views of various embodiments along plane 4A-4D-4A-4D of FIG. 3A.

Referring now to the drawings in detail wherein like numerals indicate like elements throughout the several views, one sees that FIGS. 1A-1C and 2A-2C disclose first and second embodiments of a valve 10 (i.e., a plastic, a flexible, a bubble, or a polymeric valve), comprising a bubble 12 and a channel 14. The valve 10 is attachable to a package 100 (i.e., a container or a pouch), the package having an internal volume for retaining contents which a user may dispense through the valve 10.

The bubble 12 includes an enclosed material. The enclosed material is trapped between a base layer 16 (i.e., a first exterior layer) of film and a bubble layer 18 (i.e., at least one interior layer) of film to create the bubble 12 of a desired shape and size to act as a flow regulator with respect to channel 14. The channel 14 is formed around the bubble 12 by two layers—the bubble layer 18 and a channel layer 20 (i.e., a second exterior layer)—sealed together through which liquid can flow through channel 14. Some embodiments may implement a panel portion of the package as one of layers 16, 18, 20.

In some embodiments, the enclosed material is a gas or a liquid. In such embodiments, the pressure of the liquid or the gas is a physical characteristic of the bubble 12 that biases the channel 14 from an open position towards a closed position. In one embodiment, the enclosed material is ambient air trapped during sealing of the layers 16, 18. In another embodiment, the enclosed material further includes supplemental, pressurized, or inflated air added to the bubble 12 after sealing of the layers 16, 18.

In yet another embodiment, the enclosed material inside the bubble 12 is a solid such as, for example, but not limited to, a urethane sponge or a rubber nub. In such embodiments, the elasticity of the solid imparts or affects a physical characteristic of the bubble 12 that biases the channel 14 from an open position towards a closed position. The solid enclosed material is trapped between the base layer 16 and the bubble layer 18 during sealing of the layers 16, 18. The shaping and dimensions of the bubble 12 and the channel 14, along with the film types of the layers 16, 18, 20 can be customized to the specific needs of the product and/or consumer or user requirements. Such specific needs include, for example, but are not limited to, opening force of the valve 10, closing (i.e., shut-off) force of the valve 10, flow characteristics (i.e., opening/closing responsiveness) of the valve 10, and viscosity of contents (if liquid; solid contents are also possible) in a package.

FIGS. 1A, 1B, and 1C illustrate a first embodiment of the valve 10 of the present disclosure—a flat channel layer embodiment. The valve 10 includes a base layer 16 (i.e., a first exterior layer), a bubble layer 18 (i.e., at least one interior layer), and a channel layer 20 (i.e., a second exterior layer). In one embodiment, the layers 16, 18, 20 are made of plastic (or polymeric) film that is some variant of a flexible plastic film. As one skilled in the art would recognize, if the valve 10 is used in a food setting, the plastic film should be compliant with food safety and chemical regulations. In some embodiments, each layer of plastic film 16, 18, 20 is a multi-layer film. A multi-layer film may provide, among other things, sealant capabilities desired by a manufacturer, consumer or user. The plastic film is made of, for example, but not limited to, polyethylene and/or polypropylene or a combination thereof. In one embodiment, the base layer 16 is made of a first plastic film and the bubble layer 18 and channel layer 20 are made of a second plastic film differing from the first plastic film.

A static planar footprint 22 (i.e., bubble footprint) may be embossed or formed on the bubble layer 18 of plastic film. The static planar footprint 22 is typically formed using at least one of vacuum forming and thermoforming processes. The bubble layer 18 with embossed static planar footprint 22 is applied to the base layer 16 of plastic film. The bubble 12 is thereby typically formed from the enclosed material captured between the bubble layer 18 and the base layer 16 with the static planar footprint 22 and a pre-tension height ("X" as illustrated in FIG. 1B). FIG. 1B illustrates the valve 10 after the application of the bubble layer 18 to the base layer 16. As described above, the bubble 12 includes an enclosed material. The step of applying plastic film layers 16, 18, 20 to each other is accomplished by, for example, but not limited to, sealing the two layers of plastic film together typically using heat or ultrasonics. In some embodiments, two or three of the layers 16, 18, 20—base, bubble, and channel; or first exterior, at least one interior, second exterior—are made of a single plastic film that has been folded (see, for example, FIGS. 11-18).

Next, the channel layer 20 (i.e., second exterior layer) is applied to the bubble layer 18 (i.e., at least one interior layer). In the embodiment illustrated in FIGS. 1A-1C, the channel layer 20 is flat. The channel layer 20 is sealed to at least one of the base layer 16 and the bubble layer 18 typically using heat or ultrasonics. The channel 14 forms between the channel layer 20 and the bubble layer 18. The channel 14 will allow and control dispensing of products from an internal or storage volume of a package when a consumer or user applies a pressure by squeezing the package (see element 100 in FIGS. 8A-8E). When a user applies a pressure less than the pressure between the bubble 12 and the channel 14 (i.e., an opening threshold), the channel 14 is in a closed position and contents of the package do not flow past the valve 10. The closed position of the channel 14 restricts flow of contents through the valve 14. When the user applies a pressure greater than the pressure between the bubble 12 and the channel 14, the channel 14 is in an open position and contents flow from the internal volume of the package through the valve 10.

FIG. 1C illustrates the assembly after the application of the channel layer 20. The channel 14 and the bubble 12 are formed. The channel layer 20 is applied to the bubble layer 18 and the base layer 16 under tension. During application of the channel layer 20, the bubble 12 undergoes a transformation. The bubble 12 decreases in height from the pre-tension height "X" (FIG. 1B) to a post-tension height "Y1" (FIG. 1C). Along with the post-tension height, the bubble 12 has an increased or higher internal pressure (i.e., the enclosed material is compressed). The bubble footprint 22 remains the same. However, the overall volume has decreased because the height has decreased, and thus the internal pressure has increased because the same amount of enclosed material (e.g., ambient air) is trapped between the bubble layer 18 and the base layer 16 in the bubble 12. The channel 14 may be shaped above and around the bubble 12 (see, for example, FIGS. 4A-6B).

In one embodiment, the pressure of the enclosed material is the physical characteristic of the bubble 12 that biases the channel 14 from the open position towards the closed position, thus restricting flow of the contents through the channel 14. In another embodiment, the height of the bubble 12 is the physical characteristic of the bubble 12 that biases the channel 14 from the open position towards the closed position. During manufacturing, tension of the channel layer 20 during application and sealing to the bubble layer 18 can be customized to the specific needs of the product and/or consumer or user requirements. In some embodiments, the tension of the channel layer 20 (i.e., the second exterior layer) is another physical characteristic that biases the channel 14 from an open position towards a closed position.

FIGS. 2A, 2B, and 2C illustrate a second embodiment of the valve 10 of the present disclosure—a formed channel layer embodiment. The valve 10 includes a base layer 16 (i.e., a first exterior layer), a bubble layer 18 (i.e., at least one interior layer), and a channel layer 20 (i.e., a second exterior layer). As described above, the layers may be made of plastic (or polymeric) film and some variant of a flexible plastic film. The plastic film is made of, for example, but not limited to, polyethylene and/or polypropylene or a combination thereof. In one embodiment, the base layer 16 is made of a first plastic film and the bubble layer 18 and channel layer 20 are made of a second plastic film differing from the first plastic film.

A static planar footprint 22 is embossed or formed on the bubble layer 18 of plastic film. The static planar footprint 22 is typically formed using at least one of vacuum forming and thermoforming processes. The bubble layer 18 with embossed static planar footprint 22 is applied to the base layer 16. The bubble 12 is thereby typically formed from the enclosed material captured between the bubble layer 18 and the base layer 16 with the static planar footprint 22 and a pre-tension height ("X" as illustrated in FIG. 2B). FIG. 2B illustrates the assembly after the application of the bubble layer 18 to the base layer 16. The step of applying the base and bubble plastic film layers 16, 18 to each other is accomplished by, for example, but not limited to, sealing the two layers of plastic film together typically using heat or ultrasonics. In some embodiments, two or three of the plastic film layers 16, 18, 20—base, bubble, channel; or first exterior, at least one interior, second exterior—are made of a single plastic film that has been folded (see, for example, FIGS. 11-18).

Next, the channel layer 20 is applied to the bubble layer 18. In the embodiment illustrated in FIGS. 2A-2C, the channel layer 20 is embossed or formed. The channel layer is embossed with a channel footprint 24. In one embodiment, the channel footprint 24 is the same size or larger than the static planar footprint 22 of the bubble layer 18. Larger, as in, for example, but not limited to, a wider planar footprint or a loose/more material in the emboss/form. In another embodiment, the channel footprint 24 is smaller than the static planar footprint (see, for example, FIG. 3D). The channel footprint 24 is typically formed using at least one of vacuum forming and thermoforming processes. In one embodiment, the channel footprint 24 of the embossed channel layer 20 is formed using both vacuum forming and thermoforming processes. The shaping and dimensions of the footprints 22, 24 using vacuum forming and/or thermoforming processes can be customized to the specific needs of the product and/or consumer or user requirements. Such specific needs include, for example, but are not limited to, opening force and speed of the valve 10, closing (i.e., shut-off) force and speed of the valve 10, and viscosity of contents (if liquid; solid contents are also possible) in a package.

The channel layer 20 is sealed to at least one of the base layer 16 and the bubble layer 18 typically using heat or ultrasonics. A channel 14 forms between the channel layer 20 and the bubble layer 18. As described above, the channel 14 will allow and control dispensing of products from an internal volume of a package when a consumer or user applies a pressure by squeezing the package (see element 100 in FIGS. 8A-8E). When a user applies a pressure less than the pressure between the bubble 12 and the channel 14 (i.e., an opening threshold), the channel 14 is in a closed position and contents of the package do not flow past the valve 10.

FIG. 2C illustrates the assembly after the application of the channel layer 20. The channel 14 and the bubble 12 are formed. The channel layer 20 is applied to the bubble layer 18 and the base layer 16 under tension. During application of the channel layer 20, the bubble 12 undergoes a transformation. The bubble 12 decreases in height from the pre-tension height "X" (FIG. 2B) to a post-tension height "Y2" (FIG. 2C). Along with the post-tension height, the bubble 12 has an increased or higher internal pressure (i.e., the enclosed material is compressed). The static planar footprint 22 of the bubble 12 remains the same. However, the overall volume has decreased because the height has decreased, and thus the internal pressure has increased because the same amount of enclosed material (e.g., ambient air) is trapped between the bubble layer 18 and the base layer 16 in the bubble 12.

In one embodiment, the pressure of the enclosed material is the physical characteristic of the bubble 12 that biases the channel 14 from the open position towards the closed position, thus restricting flow of the contents through the valve 10. In another embodiment, the height of the bubble 12 is the physical characteristic of the bubble 12 that biases the channel 14 from the open position towards the closed position. During manufacturing, tension of the channel layer 20 during application and sealing to the bubble layer 18 can be customized to the specific needs of the product and/or consumer or user requirements. In some embodiments, the tension of the channel layer 20 (i.e., the second exterior layer) is another physical characteristic that biases the channel 14 from the open position towards the closed position.

A manufacturer of plastic valves can choose between using the first embodiment of the present disclosure (FIGS. 1A-1C, flat channel layer) and the second embodiment of the present disclosure (FIGS. 2A-2C, formed channel layer) based on preferred characteristics of the plastic valve 10 and the container (see element 100 in FIGS. 8A-8E) into which the plastic valve 10 is placed. In one embodiment, the embossed channel layer may be used for the channel 14 to be easier to put into the open position and dispense product from the container (see element 100 in FIGS. 8A-8E). In another embodiment, the flat channel layer may be used for the channel 14 to be harder to put into the open position (i.e., overcome the physical characteristic that biases the channel towards the closed position, or the opening threshold). The degree of flatness or forming of the channel layer 20 alters the final height, volume, and pressure of the both the bubble 12 and the channel 14 (see, for example, FIGS. 5A-6B). Shapes and orientations of the layers 16, 18, 20, bubble 12, and channel 14 other than those illustrated are within the range of equivalents of the present disclosure. Other shapes include, but are not limited to, oval shaped, triangular shaped, and rectangular shaped bubbles 12 and/or channels 14 (see, for example, FIGS. 7A-7F).

In addition to varying the embossing of layers 18, 20—via vacuum forming and/or thermoforming—characteristics of the valve 10 can be customized by varying how the layers 16, 18, 20 are sealed. The bubble 12 is formed by applying a bubble seal 19—via heat and/or ultrasonics—between the base layer 16 (i.e., the first exterior layer) and the bubble layer (i.e., the at least one interior layer). The bubble seal 19 may be applied along the static planar footprint 22 (of FIGS. 1A-2C), or at an offset. The channel 14 is formed by applying a channel seal 21—via heat and/or ultrasonics— between the channel layer 20 (i.e., the second exterior layer) and at least one of the base and bubble layers 16, 18 (i.e., the first exterior and the at least one interior layers). In some embodiments, the channel seal 21 is applied to all three layers. The channel seal 21 may be applied along the channel footprint 24 (of FIGS. 2A-2C), or at an offset.

Figure 5A:
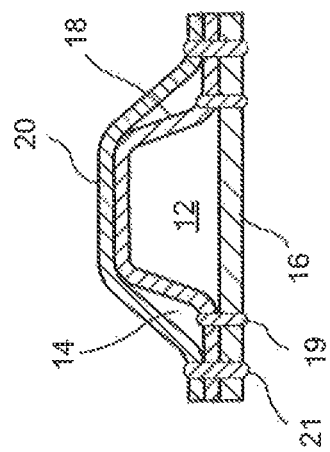
FIGS. 5A and 5B are cross-sectional views related to FIGS. 1A, 1B, and 1C.
Figure 5B:
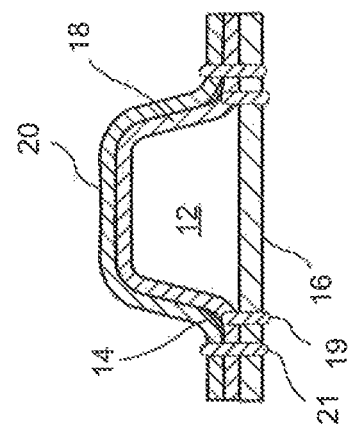
Figure 6A:
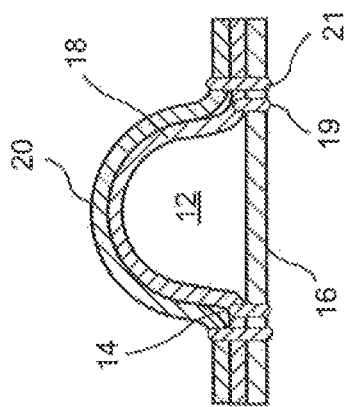
FIGS. 6A and 6B are cross-sectional views related to FIGS. 2A, 2B and 2C.
Figure 6B:
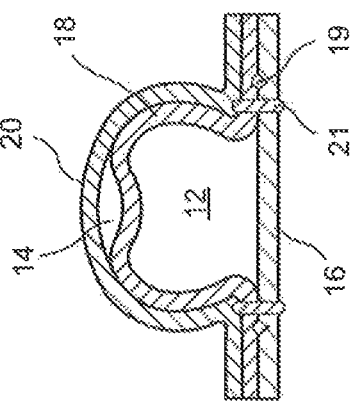

FIGS. 5A and 5B are transverse cross-sectional views related to the flat channel layer embodiment of FIGS. 1A, 1B and 1C while FIGS. 6A and 6B are transverse cross-sectional views related to the formed channel layer embodiment of FIGS. 2A, 2B and 2C. A difference in offsets between the seals 19, 21 is illustrated between FIGS. 5A and 5B. The channel 14 dimensions can be customized based on the offset of the channel seal 21 from the bubble seal 19. For example, the channel 14 of FIG. 5B is smaller than the channel 14 of FIG. 5A. The channel 14 can be formed on the side of the bubble 12 or above the bubble 12 depending on the embossing (vacuum forming or thermoforming) of the layers 16, 18, position of the seals 19, 20, type of enclosed material in the bubble 12, and the material of the layers 16, 18, 20. FIG. 6A illustrates the channel seal 21 applied outside the bubble seal 19 (i.e., exterior offset) while FIG. 6B illustrates the channel seal 19 applied closer/past the bubble seal 19 (i.e., interior offset).

FIGS. 3A-3D illustrate various configurations of the channel seal 21 between the bubble layer 18 and the channel layer 20. The channel seal 21 is illustrated as a double seal to increase integrity, but single seals may likewise be used. The channel seal 21 defines the channel 14 so as to have an inlet 32 (receiving product from the container with is typically attached to valve 10 by flanges or attachment sections 33) and an outlet 34 (dispensing product to the consumer or user through a gap in the channel seal 21). The bubble 12 is illustrated as defined by the bubble seal 19 (along or offset from the static planar footprint 22 described above with respect to FIGS. 1A-2C). Generally, the configuration of FIG. 3A is expected to achieve the greatest flow, requiring the least effort or force to dispense the product from the container through the valve 10, with configurations of FIGS. 3B, 3C and 3D requiring progressively more effort or force to dispense the product from the container through the valve 10.

The outlet 34 is shown in various positions between FIGS. 3A-3C. The outlet 34 of FIG. 3A is further past the bubble 12 than the outlet of FIG. 3B, while the outlet of FIG. 3C is less past the bubble 12 than the outlet of FIG. 3B. The channel 14 has an overlap section between the inlet 34 and the outlet 32 proximate the bubble 12.

Figure 4B:
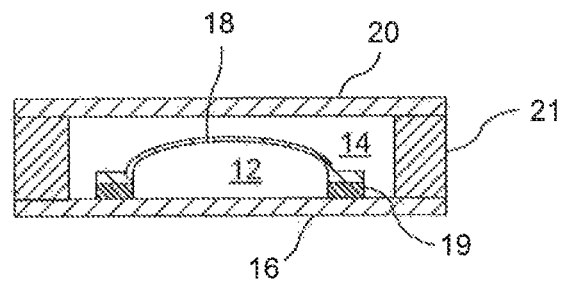
Figure 4C:
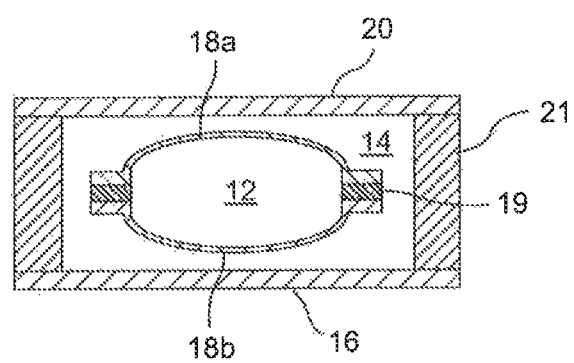
Figure 4D:
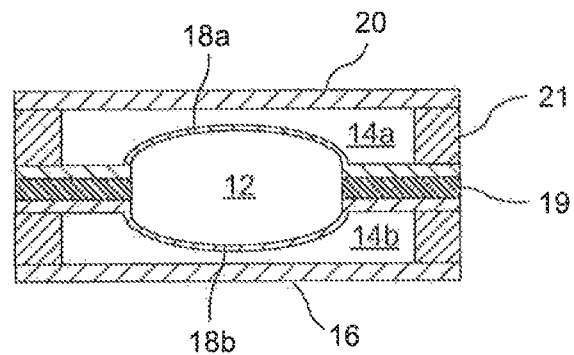

FIGS. 4A, 4B, 4C and 4D are cross-sectional views of different embodiments along the cross-sectional plane of FIG. 3A. FIGS. 4A and 4B illustrate the base layer 16 and the channel layer 20 as exterior layers and the bubble layer 18 as an interior layer. FIG. 4A illustrates the bubble layer 18 extending to the edges of the base layer 16 whereas FIG. 4B illustrates the bubble layer 18 being attached or sealed to laterally interior portions of the base layer 16. FIGS. 4C and 4D illustrate the bubble layer implemented as first and second interior bubble layers 18a, 18b, with the bubble 12 formed between the interior bubble layers 18a, 18b. Interior layers 18a, 18b are secured by bubble seal 19. FIG. 4C illustrates the exterior layers 16, 20 secured to each other by the channel seal 21. FIG. 4D illustrates a first channel 14a formed by securing the second exterior layer 20 to the second interior layer 18a by channel seal 21a, and a second channel 14b formed by securing the first exterior layer 16 to the first interior layer 18b by channel seal 21b. It is noted that in FIGS. 4A-4D, the gap between layers 18, 20 is illustrated as enlarged for demonstrative purposes. Layers 18, 20 lie on top of each other in the closed configuration, in the absence of pressure/squeezing by the user or consumer. In the open configuration, the channel 14 opens in a location proximate to the bubble 12 in response to pressure or squeezing by the user or consumer.

In all of these embodiments, physical characteristic of the bubble 12 biases the channel 14 from an open position towards a closed position that restricts flow of the contents from the inlet 32 to the outlet 34, as illustrated in FIGS. 3A, 3B, 3C and 3D. The physical characteristic of the bubble 12 is, for example, but not limited to, the height of the bubble 12, the pressure of the gas/liquid enclosed material, and the elasticity of the solid enclosed material. Another physical characteristic that biases the channel 14 may be, for example, but not limited to, the tension of the exterior layers 16, 20.

Figure 7A:
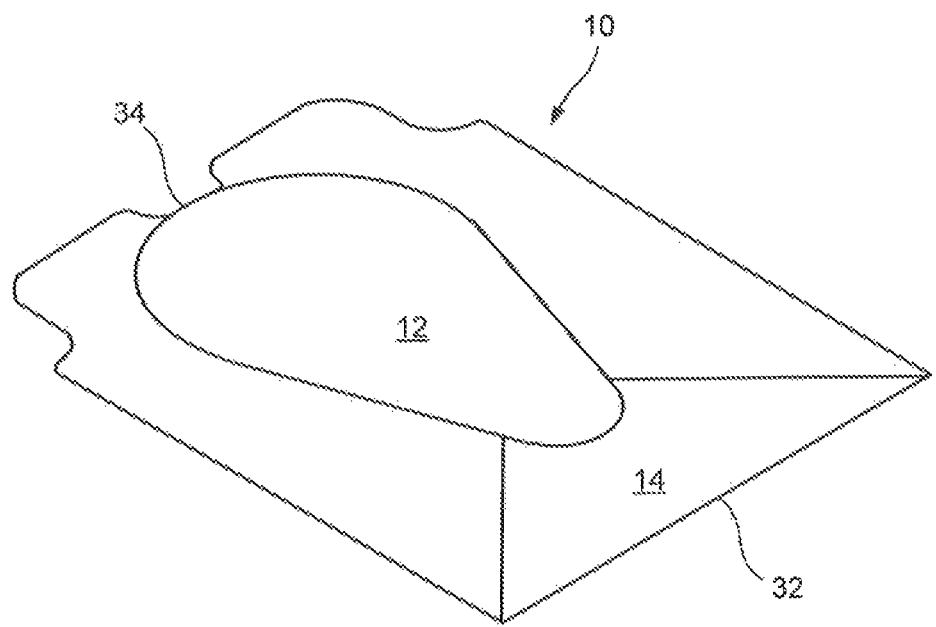
FIGS. 7A, 7B, 7C, 7D, 7E, 7F, 7G and 7H illustrate various possible alternatives for the shape of the bubble as formed by the bubble layer.
Figure 7B:
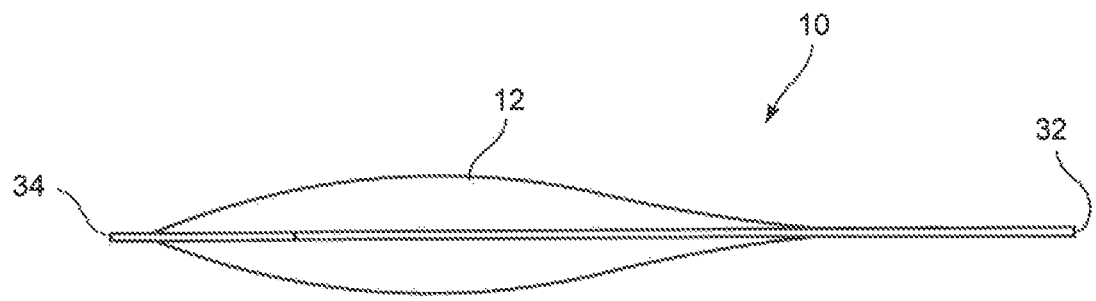
Figure 7C:
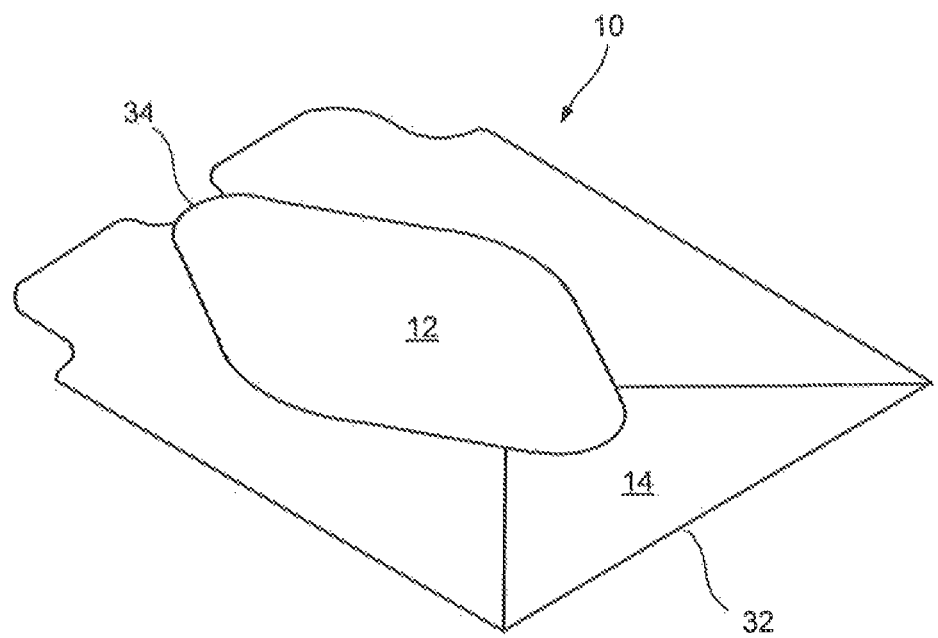
Figure 7D:
Figure 7E:
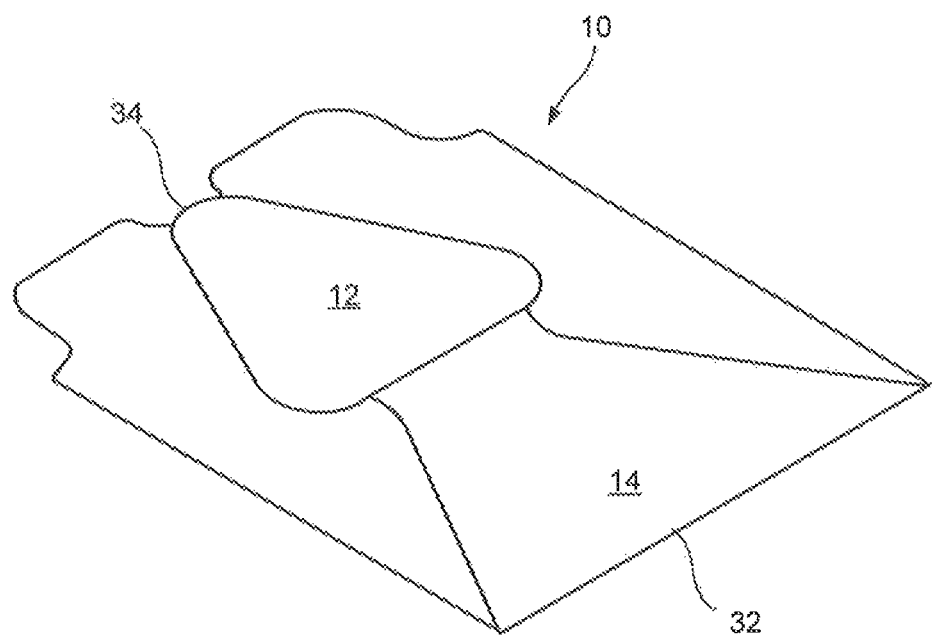
Figure 7F:
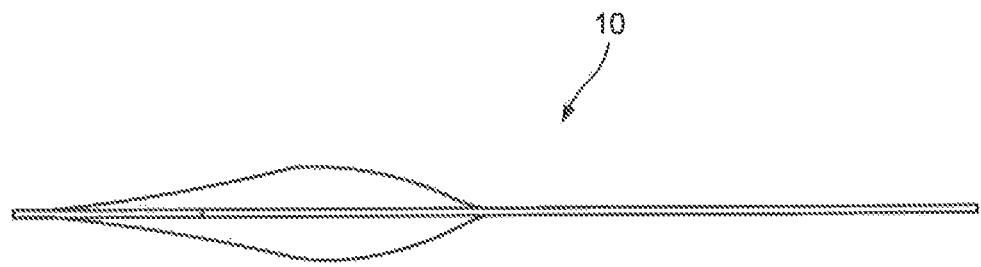

FIGS. 7A, 7B, 7C, 7D, 7E, 7F, 7G and 7H illustrate various possible alternatives for the shape of the bubble 12 as formed by the layers 16, 18, 20 of the valve 10. FIG. 7A illustrates an egg-shaped or teardrop-shaped bubble 12 with the major or enlarged end directed toward the outlet 34. FIG. 7B illustrates that the bubble 12 can extend in both directions (i.e., towards the inlet 32 and the outlet 34) orthogonal to the valve 10. FIG. 7C illustrates a rounded-diamond shape bubble 12 with the major axis aligned with the outlet 34. FIG. 7D illustrates that the bubble 12 can extend in both directions orthogonal to the valve 10. FIG. 7E illustrates an arrowhead-shaped bubble 12 with the point oriented toward the outlet 34. FIG. 7F illustrates that the bubble 12 can extend in both directions orthogonal to the valve 10. A portion of the channel 14 labeled in FIGS. 7A-7H is the non-overlap section of the channel 14. As discussed above with respect to FIGS. 3A-3D, the channel 14 includes an overlap section proximate to the bubble 12.

Figure 7G:
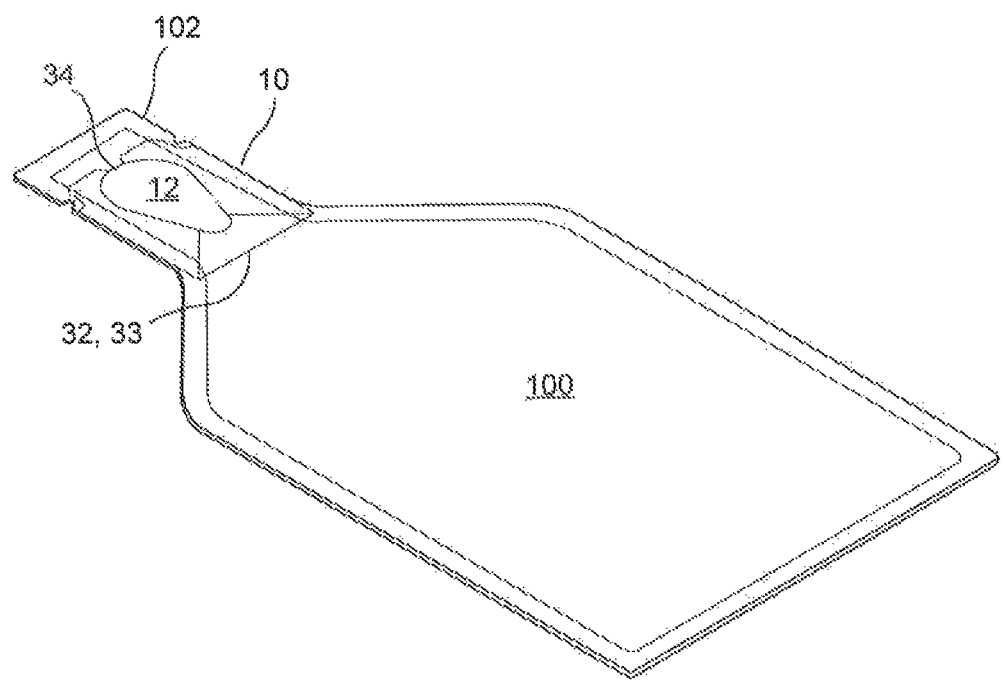
Figure 7H:
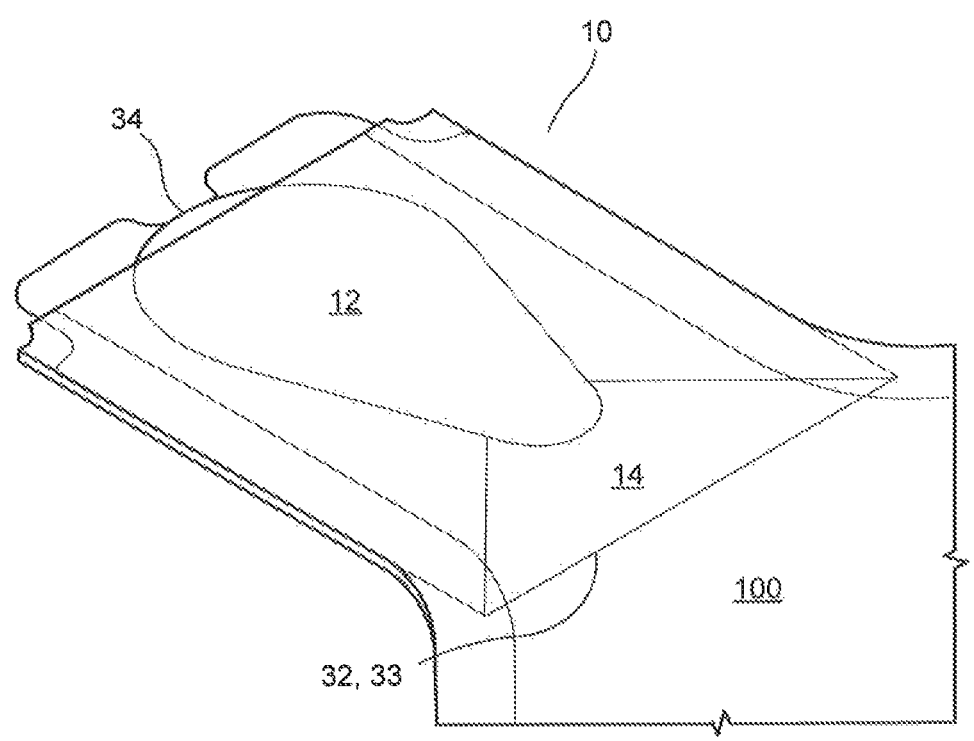

FIGS. 7G and 7H illustrates a valve 10 with the bubble 12 shaped as shown in FIG. 7A, attached to a container, package or pouch 100, with a tear-top 102 formed immediately above the outlet 34 illustrated in FIG. 7G. The package 100 is attached to the valve 10 at the attachment sections 33. The attachment sections 32 are located on at least two of the layers 16, 18, 20. In some embodiments, the inlet 32 of the channel 14 is proximate the attachment sections 33.

Figure 8A:
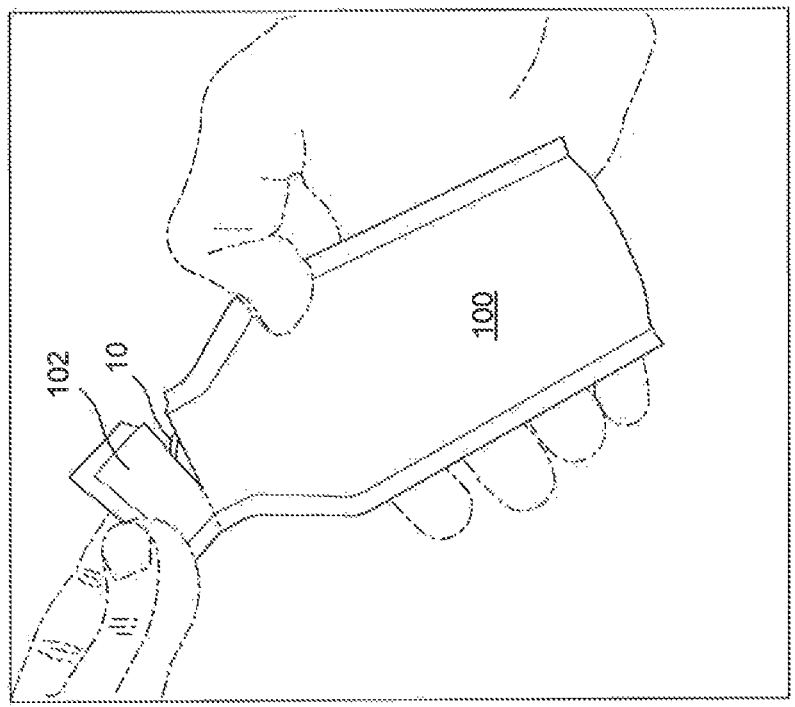
FIGS. 8A, 8B, 8C, 8D and 8E illustrate typical use of a package including a valve of the present disclosure.
Figure 8B:
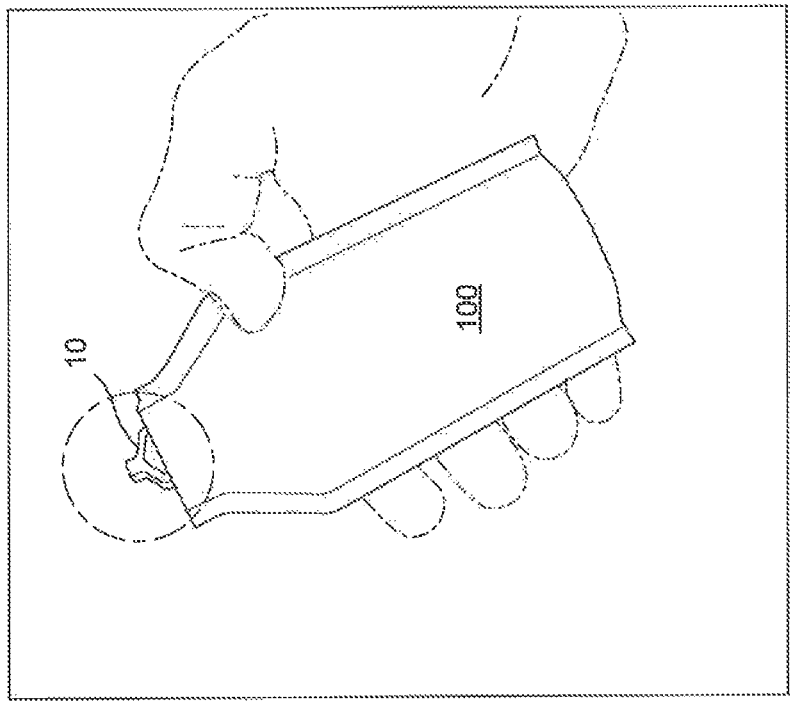
Figure 8D:
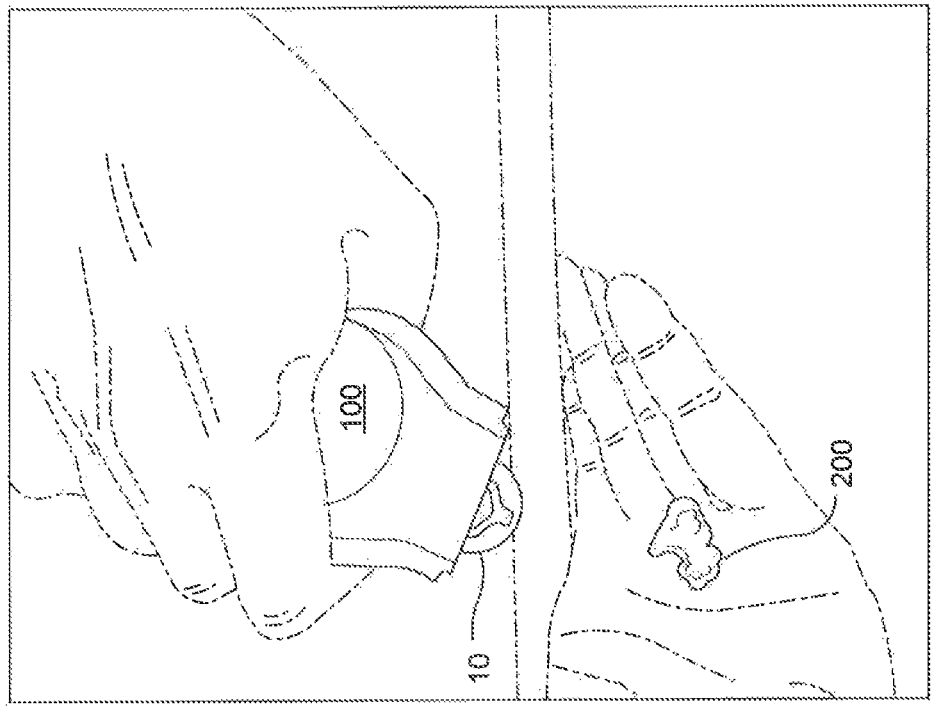
Figure 8C:
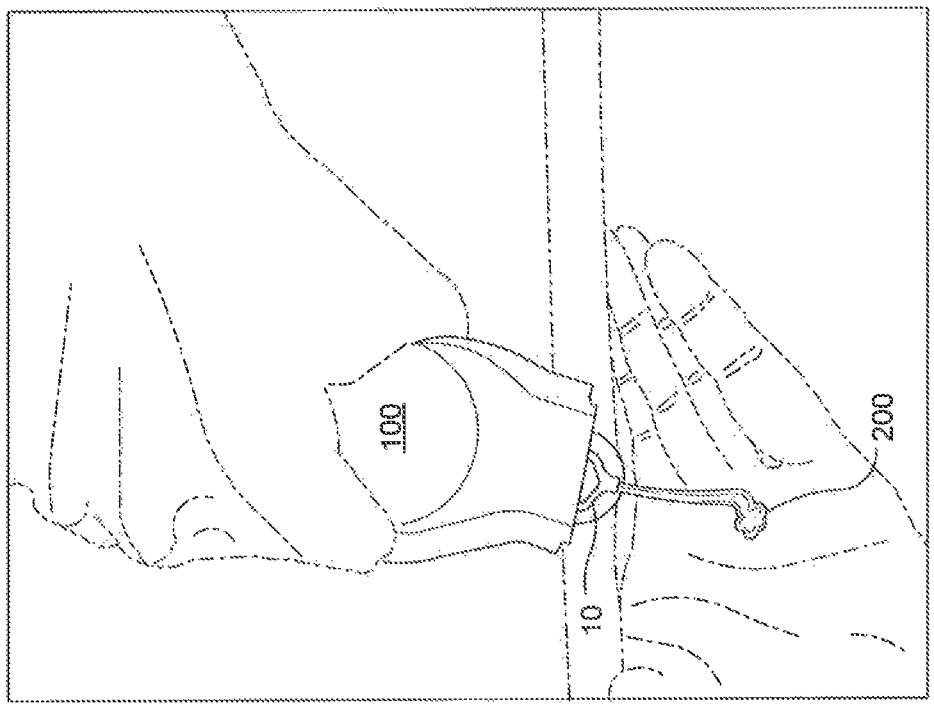
Figure 8E:
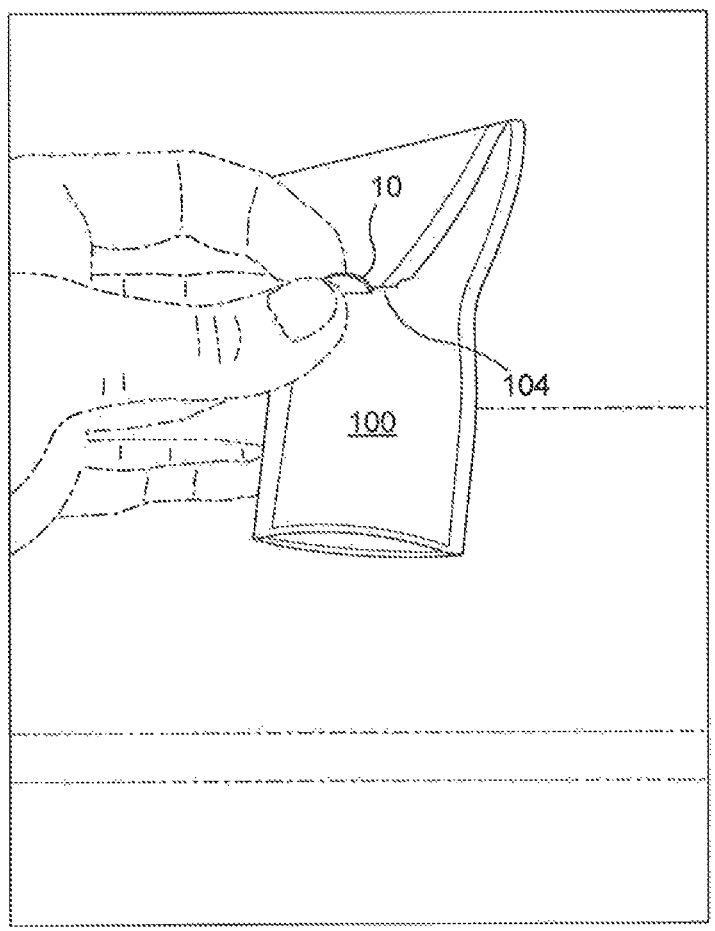

FIGS. 8A, 8B, 8C, 8D and 8E illustrate typical use of a container 100, containing liquid or lotion-type (or similar)

product 200 as dispensed via valve 10. In FIG. 8A, it is illustrated to tear the top 102 from container, package or pouch 100 so as to expose the valve 10 as shown in FIG. 8B. The consumer or user squeezes the container, package or pouch 100 so as to dispense liquid, lotion or similar product 200 through the valve 10 as shown in FIG. 8C. The channel 14 is thus in the open position in FIG. 8C. As shown in FIG. 8D, the consumer or user then releases pressure on the container, package or pouch 100 so as to stop flow of the liquid, lotion or similar product 200 through valve 100. The channel 14 is thus in the closed position in FIG. 8D—the physical characteristic of the bubble 12 biases the channel 14 to the closed position from the open position and restricts flow of the contents from the inlet 32 to the outlet 34 (i.e., through the channel 14, valve 10). As shown in FIG. 8E, the consumer or user may then tuck the tip of exposed valve 10 into pocket slit 104 formed in the body of the container, package or pouch 100.

Figure 9:
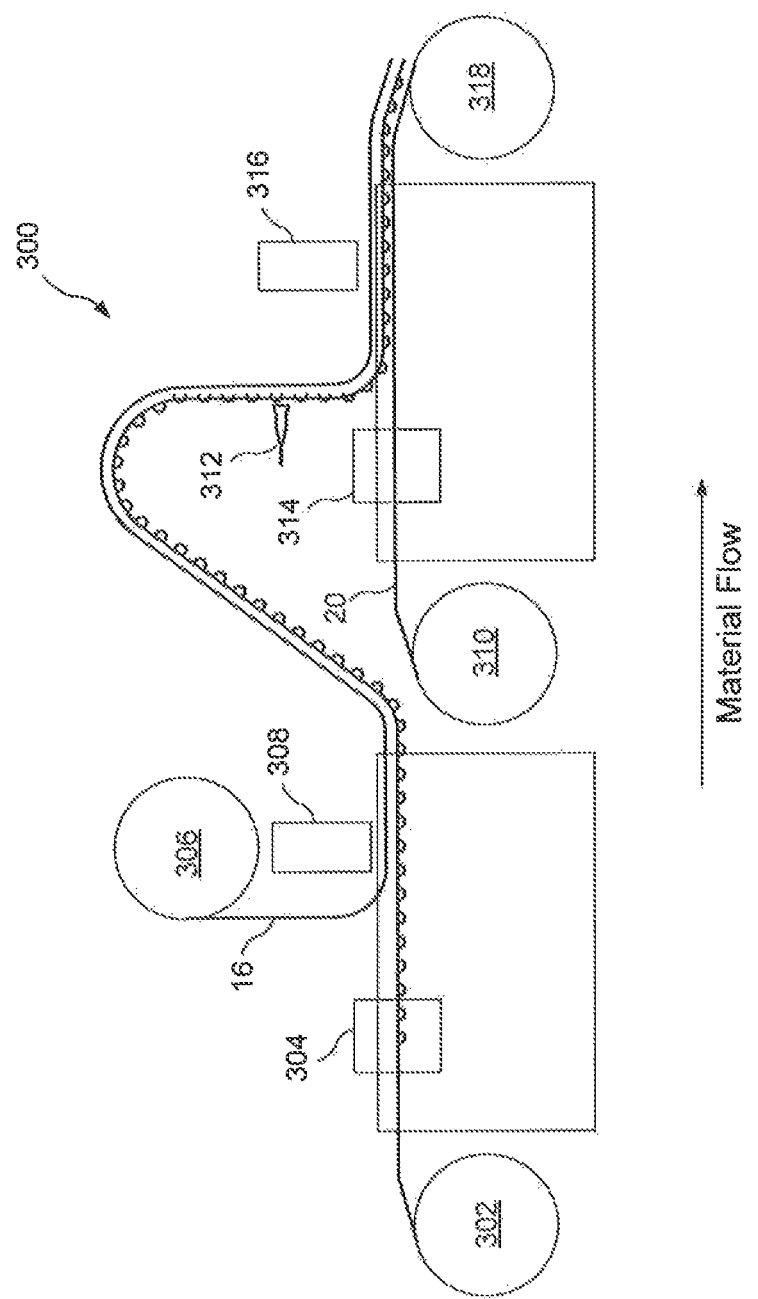
FIG. 9 is a schematic which illustrates a possible method and apparatus for manufacturing the valve.

FIG. 9 is a schematic which illustrates a possible method and apparatus 300 for manufacturing the valve 10. The layout of apparatus 300 is directed to the embodiments with the base layer 16, bubble layer 18, and channel layer 20. The polymeric or similar sheet material for the bubble layer 18 is provided by bubble layer unwind or spool 302. The bubble footprint 22 (i.e., bubble shape, planar static footprint) is formed by the bubble layer thermoformer 304. The polymeric or similar sheet material for the base layer 16 is provided by base layer unwind or spool 306 and is sealed to the bubble layer 18 by bubble to base ultrasonic sealer 308 (i.e., applying bubble seal 19). The polymeric or similar sheet material for the channel layer 20 is provided by channel layer unwind or spool 310 and is optionally shaped by channel layer thermoformer 314 (i.e., channel footprint 24). The channel layer 20 is sealed to the combination of the base layer 16 and bubble layer 18 by channel to bubble ultrasonic sealer 316 (i.e., applying channel seal 21). The resultant concatenation of bubble valves is accumulated on finished valve rewind 318. The valves may be separated from each other in a separate manufacturing step, possibly at a different place and time, for the final formation of the containers, packages or pouches.

A printer 312 provides the desired printing onto bubble layer 18. The coating, such as, but not limited to, nitrocellulose or silicone, is intended to eliminate or minimize the sealing of the channel layer 20 to the bubble layer 18—possibly closing the channel 14 and impairing the operation of the valve 10—at the thermoformer 316. In some embodiments, a separator plate (see FIGS. 11 and 12) may be used to eliminate or minimize the sealing of the channel layer 20 to the bubble layer 18 at the channel 14. In other embodiments, the layers 18, 20 may be composed of a film that has different sealing temperatures on different portions of the surface area.

The method and apparatus 300 illustrated in FIG. 9 may be reorganized or expanded to accommodate additional layers of film or processes. In one embodiment, an additional unwind or spool is used when the bubble 12 is created from two interior layers 18a, 18b (e.g., the embodiment illustrated in FIGS. 4C and 4D). The interior layers may be sealed together first, followed by the exterior layers 16, 20 being sealed to each other or the interior layers 18a, 18b. In another embodiment, an additional ultrasonic sealer (or heat sealer, or combination thereof) may be used to apply a second channel seal 21 to form a second channel 14b (e.g., the embodiment illustrated in FIG. 4D).

In another embodiment, an additional thermoformer (or vacuum former, or combination thereof) may be used to form the bubble footprint 22 on the two interior layers 18a, 18b (e.g., the embodiment illustrated in FIG. 4D). In yet another embodiment, the channel layer thermoformer 314 is not used because no channel footprint 24 is formed (e.g., the embodiment illustrated in FIGS. 5A and 5B). Prior to manipulation in the apparatus 300 (i.e., prior to collection on the spools 302, 306), one of the base layer 16 and the channel layer 20 may have a solid material applied to it that becomes the solid enclosed material. In another embodiment, an injection machine is used before or after the ultrasonic sealer 308 to add a gas (e.g., nitrogen or additional ambient air) or liquid (e.g., water) enclosed material to the bubble 12.

Figure 10:
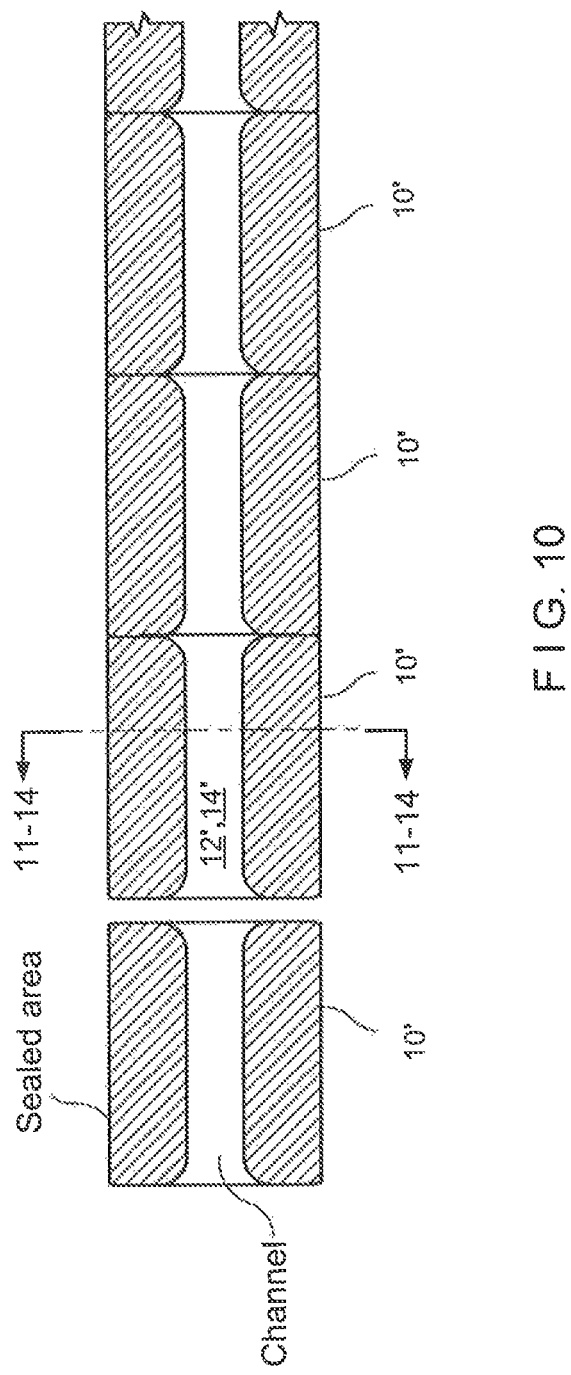
FIG. 10 is a side cut-away view of a valve manufactured by an embodiment of the method of the present disclosure.
Figure 11:
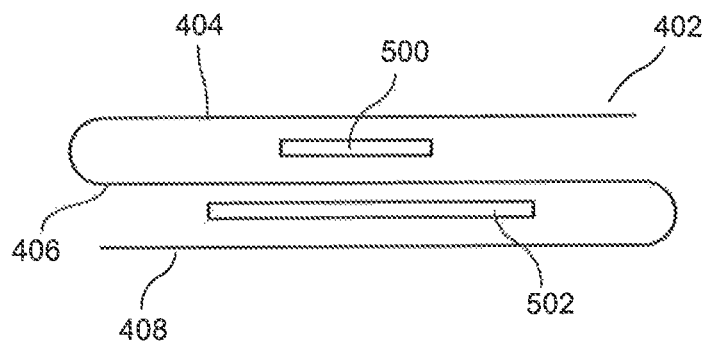
FIG. 11 is a cross-sectional view along plane 11/14-11/14 of FIG. 10, illustrating a folded single web of an alternative embodiment of a valve of the present disclosure.
Figure 12:
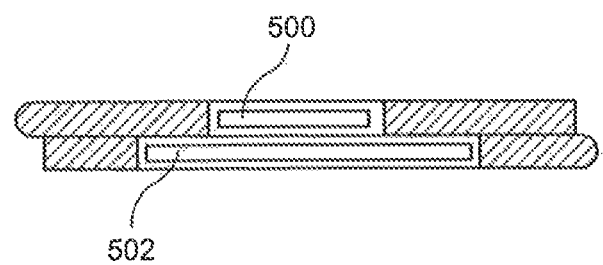
FIG. 12 is a cross-sectional view along plane 11/14-11/14 of FIG. 10, illustrating sealing around separator plates/guides.
Figure 13:
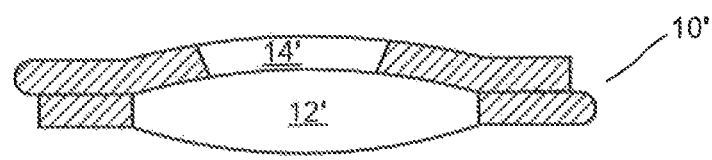
FIG. 13 is a cross-sectional view along plane 11/14-11/14 of FIG. 10, illustrating a bubble in an inflated configuration.
Figure 14:
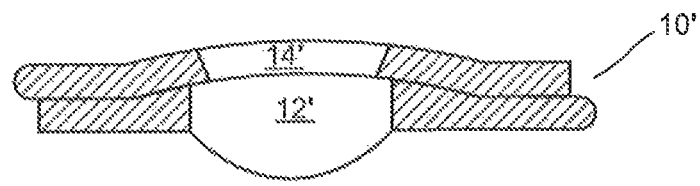
FIG. 14 is a cross-sectional view along plane 11/14-11/14 of FIG. 10, illustrating how pressure in the bubble can be increased by subsequent seals.
Figure 15:
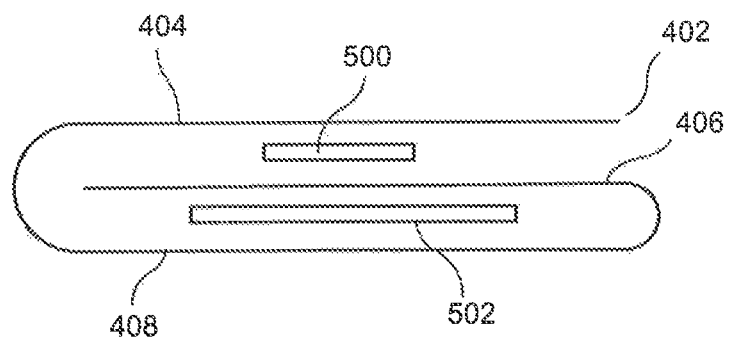
FIGS. 15-18 relate to a folded single web of a second alternative embodiment of the present disclosure, corresponding to FIGS. 11 to 14.
Figure 16:
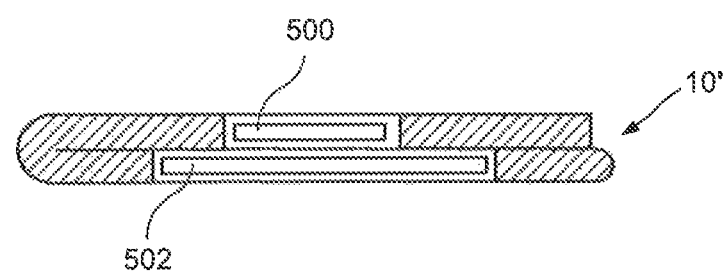
Figure 17:
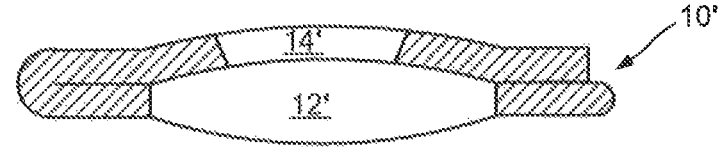
Figure 18:
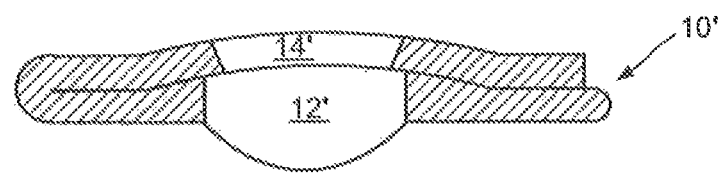

As seen in FIG. 10, a valve 10' for dispensing liquids/semi-liquids, with a bubble 12' and channel 14', can be formed from a web of film 402. As shown in FIG. 11, the web 402 is folded to create three overlapping layers 404, 406, 408 either by making a Z-fold or by rolling up the web 402. Between the middle layer 406 and the outer layer 404, a channel 14' is formed by sealing two layers together using heat or ultrasonics, some type of separating material, such as separator plates 500 and 502 (see FIGS. 11 and 12) may be required to keep the other chamber from sealing together. The cross-hatched areas of these figures represent heat or ultrasonic sealed areas. A bubble 12', acting as a shape retaining element or a shape memory element, is created between the middle layer 406 of film and the opposite outer web 408. The dispensing channel 14' is stretched over the bubble 12' (acting as a shape-retaining element) so that it is pinched closed and fluid can only be forced through the channel when sufficient pressure is applied to the product chamber (see FIGS. 13 and 14).

Alternatively, as illustrated in FIGS. 15-18, the film 402 could be folded into a J-fold and seals made between the overlapping layers 406, 408. Subsequently, the third layer 404 of film could be folded and the final seals made. Additionally, one could additionally seal off the edges of the bubble 12' (applying a subsequent seal between steps illustrated in FIGS. 17 and 18), accomplishing a similar increase in height of the bubble 12 and pressure of the enclosed material as the steps illustrated in FIGS. 1A-1C and 2A-2C and described above.

Figure 19:
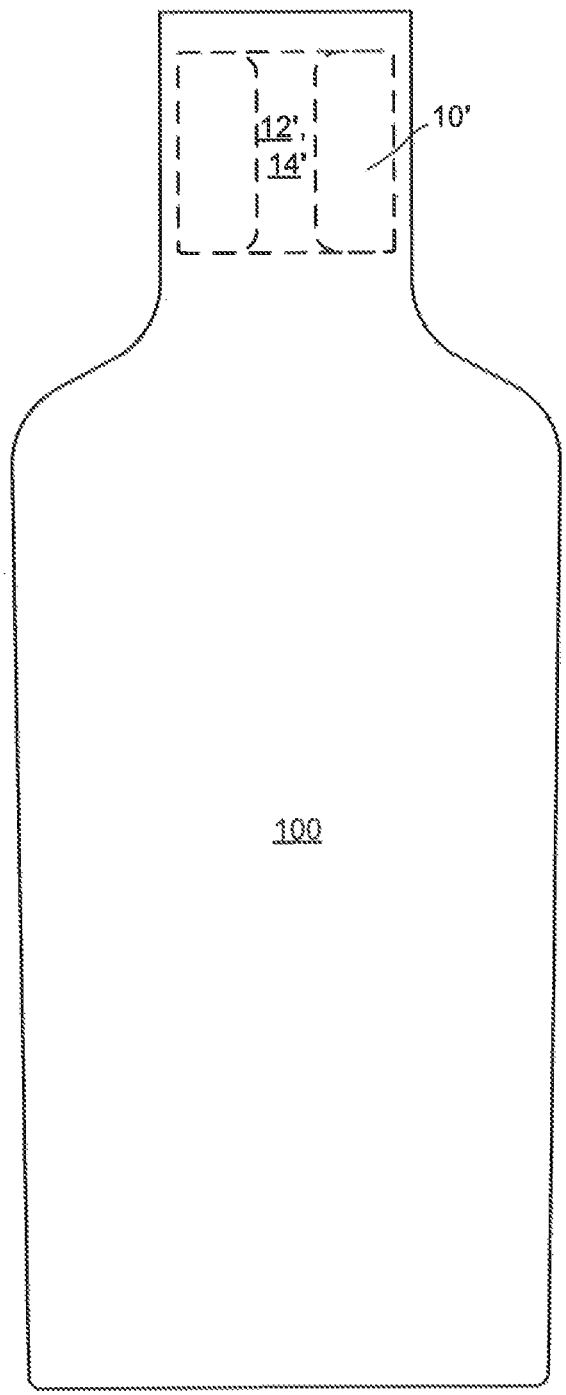
FIG. 19 is a plan view of the valve installed in the neck of a package.

Thus, in the manners illustrated in FIGS. 11-14 and FIGS. 15-18, a single sheet of web 402 can be used to create the entire valve 10'. FIG. 19 is a plan view of the valve 10' installed in the neck of a container, package or pouch 100.

Thus, the several aforementioned objects and advantages are most effectively attained. Although preferred embodiments of the invention have been disclosed and described in detail herein, it should be understood that this invention is in no sense limited thereby.

What is claimed is:

1. A valve for permitting selective dispensing of contents of a package, said valve comprising:
   a first exterior layer;
   a second exterior layer;
   a first interior layer disposed between said exterior layers;
   an attachment section located on each of at least two of said layers for permitting attachment between said valve and said package;
   a bubble formed between said first exterior layer and said first interior layer, said bubble defined by a bubble seal between said first exterior layer and said first interior layer, and having an enclosed material; and
   a channel formed between said second exterior layer and one of said first interior layer and said first exterior layer, said channel defined by a channel seal between said second exterior layer and said one of said first interior layer and said first exterior layer, at least a first portion of the channel seal overlapping the bubble seal and at least a second portion of said channel seal being separated from the bubble seal and passing to an inside of said bubble seal, said channel including
an inlet for fluidic communication with an internal volume of said package, and
an outlet through which said contents may be dispensed,
wherein a physical characteristic of said bubble biases said channel from an open position towards a closed position that restricts flow of said contents from said inlet to said outlet.

2. A valve according to claim 1, wherein said enclosed material is ambient air.

3. A valve according to claim 1, wherein said physical characteristic of said enclosed material is a pressure of said gas or said liquid.

4. A valve as in claim 1, wherein said interior layers are thermoformed or vacuum formed.

5. A valve according to claim 1, wherein said bubble is formed by sealing said first interior layer to said first exterior layer.

6. A valve according to claim 1, wherein said channel is formed by sealing said second exterior layer to one of said first interior layer and first exterior layer.

7. A valve as in claim 1, wherein a physical characteristic of at least one of said exterior layers biases said corresponding channel from an open position towards a closed position that restricts flow of said contents from said corresponding inlet to each of said corresponding outlet.

8. A valve according to claim 7, wherein said physical characteristic of at least one of said exterior layers is a tension of at least one of said exterior layers.

9. A valve as in claim 1, further comprising an overlap section of said channel disposed between said inlet and said outlet, wherein said overlap section is proximate said bubble.

10. A method of forming a valve through which a user may dispense contents from an internal volume of a package, said method comprising:
forming a bubble between a first exterior layer and a first interior layer by applying a bubble seal between said first exterior layer and said first interior layer and enclosing an enclosed material in said bubble; and
forming a channel between said second exterior layer and one of said first interior layer and said first exterior layer by applying a channel seal between said second exterior layer and one of said first interior layer and said first exterior layer, at least a first portion of the channel seal overlapping the bubble seal and at least a second portion of said channel seal being separated from the bubble seal and passing to an inside of said bubble seal, said channel including an inlet for fluidic communication with said internal volume and an outlet through which said contents may be dispensed,
wherein said first interior layer is disposed between said exterior layers,
wherein said bubble includes a physical characteristic that restricts flow of said contents from said inlet to said outlet.

11. A method as in claim 10, further comprising attaching said valve to said package at an attachment section located on at least two of said layers.

12. A method according to claim 11, wherein said enclosed material is ambient air.

13. A method according to claim 11, wherein said physical characteristic of said bubble is a pressure of said gas or said liquid.

14. A method as in claim 10, further comprising thermoforming or vacuum forming said interior layers.

15. A method as in claim 10, wherein a physical characteristic of at least one of said exterior layers biases said corresponding channel from an open position towards a closed position that restricts flow of said contents from said corresponding inlet to each of said corresponding outlet.

16. A method according to claim 15, wherein said physical characteristic of at least one of said exterior layers is a tension of at least one of said exterior layers.

17. A method as in claim 10, wherein said channel includes an overlap section of said channel disposed between said inlet and said outlet, wherein said overlap section is proximate said bubble.

18. A method according to claim 17, wherein separator plates are used between said layers when applying said bubble seal and said channel seal.

19. A method as in claim 10, wherein said seals are applied using ultrasonic welding.

20. A package for retaining and dispensing contents to a user, comprising:
a rear panel portion;
a front panel portion;
an internal volume defined between said panel portions, said internal volume operable to retain said contents; and
a valve including
a first exterior layer;
a second exterior layer;
a first interior layer disposed between said exterior layers;
an attachment section located on each of at least two of said layers to which said panel portions are attached;
a bubble defined by a bubble seal between said first exterior layer and said first interior layer, and formed between said first exterior layer and said first interior layer, said bubble having an enclosed material; and
a channel formed between said second exterior layer and one of said first interior layer and said first exterior layer, said channel defined by a channel seal between said second exterior layer and said one of said first interior layer and said first exterior layer, at least a first portion of the channel seal overlapping the bubble seal and at least a second portion of said channel seal being separated from the bubble seal and passing to an inside of said bubble seal, said channel including
an inlet for fluidic communication with said internal volume, and
an outlet through which said contents may be dispensed,
wherein a physical characteristic of said bubble biases said channel from an open position towards a closed position that restricts flow of said contents from said inlet to said outlet.

* * * * *